UNITED STATES PATENT OFFICE.

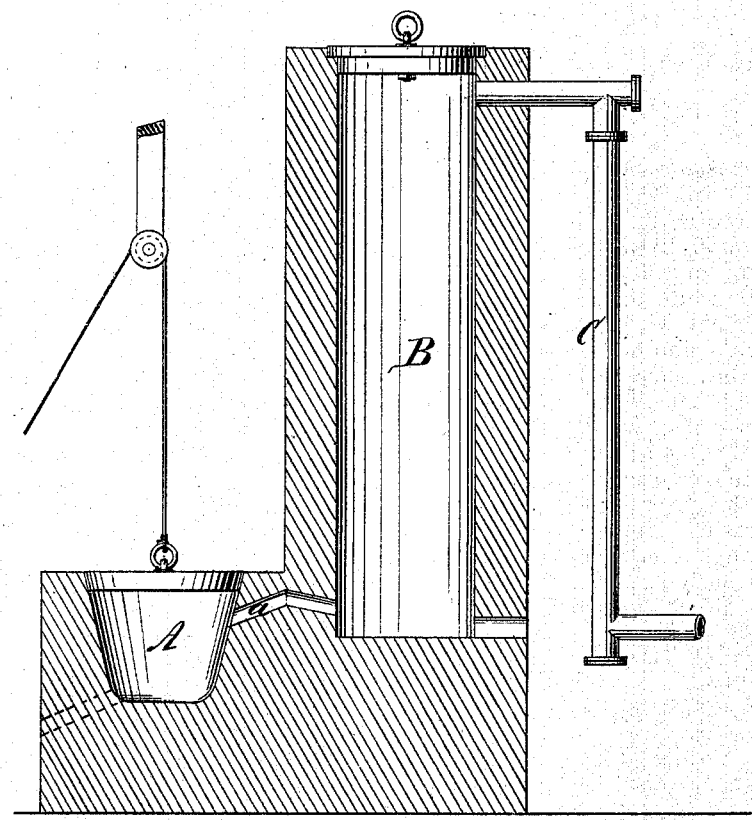

HENRI SIEGER, OF NEW YORK, N. Y.

IMPROVEMENT IN RECOVERING ZINC FROM ZINC-FUMES.

Specification forming part of Letters Patent No. 146,286, dated January 6, 1874; application filed December 13, 1873.

*To all whom it may concern:*

Be it known that I, HENRI SIEGER, of the city, county, and State of New York, have invented a new and Improved Process for Recovering Zinc; and I do hereby declare the following to be a full, clear, and exact description thereof, which will enable those skilled in the art to make and use the same, reference being had to the accompanying drawing forming part of this specification, which drawing represents a vertical section of the apparatus which I use in carrying out my invention.

This invention consists in passing the fumes of zinc, and the gases which are evolved during the process of reducing alloys of zinc in a dry way, through a chamber containing oxide of carbon, in such a manner that the oxygen contained in said chamber is absorbed by the carbonic oxide, and the zinc is recovered in a metallic state. The fumes and gases are brought together in a heated condition, and their contact is promoted by subjecting them to a certain pressure.

In carrying out my process, I take the alloys of zinc and the smelting mixtures required for the formation of a fusible basic slag, and place them, in a perfectly dry, or by preference in a heated, state, into a furnace, or simply into a crucible. As soon as each charge is made, the top of the furnace or the mouth of the crucible is well closed, and the blast is put in again through one or more tuyeres. The fumes of zinc, and the gases which are evolved from said charge, pass, through a channel which is situated some distance above the tuyere or tuyeres, into a chamber fitted up with some material which evolves carbonic oxide, by preference charcoal or other fuel at a dark-red heat. The carbonic oxide, which has a still greater affinity for oxygen than the fumes of zinc, absorbs all the oxygen, so as to form carbonic acid, while the fumes of zinc are preserved from oxidation. The fumes of zinc pass out of the carbonic-oxide chamber through suitable pipes, which are of comparatively small diameter, and which are cooled by means of cold water at a point near to their junction with said chamber. As the fumes of zinc are thus made to pass into a narrow space free from oxygen they are for the largest part condensed in a metallic state.

In the drawing, the letter A designates the crucible or furnace containing the charge. From this crucible extends a channel, a, into the chamber B, which is filled with incandescent fuel, and from which extends a pipe, C, that serves to condense the fumes of zinc.

By this process, the zinc is recovered in a metallic state, and it can be used over and over again in the process of extracting silver and gold from lead, or in other processes of a similar nature.

What I claim as new, and desire to secure by Letters Patent, is—

The within-described process of recovering zinc in a metallic state by passing the fumes of zinc, and the gases which evolve during the operation of treating alloys of zinc in a dry state, through a chamber containing oxide of carbon, substantially in the manner herein set forth.

HENRI SIEGER.

Witnesses:
   A. H. NORRIS,
   JAMES L. NORRIS.